United States Patent
Luo et al.

(10) Patent No.: US 7,080,553 B2
(45) Date of Patent: Jul. 25, 2006

(54) MICRO-ACCELEROMETER

(75) Inventors: Xiao-bing Luo, Yongin-si (KR); Hye-jung Cho, Anyang-si (KR)

(73) Assignee: Samsung Electronics Co., Ltd., Gyeonggi-do (KR)

(*) Notice: Subject to any disclaimer, the term of this patent is extended or adjusted under 35 U.S.C. 154(b) by 9 days.

(21) Appl. No.: 11/028,520

(22) Filed: Jan. 5, 2005

(65) Prior Publication Data

US 2006/0005626 A1 Jan. 12, 2006

(30) Foreign Application Priority Data

Jul. 8, 2004 (KR) .................. 10-2004-0052953

(51) Int. Cl.
*G01P 15/00* (2006.01)
(52) U.S. Cl. ................. 73/514.05; 73/514.07; 73/514.09
(58) Field of Classification Search .............. None
See application file for complete search history.

(56) References Cited

U.S. PATENT DOCUMENTS

| | | | | | |
|---|---|---|---|---|---|
| 5,581,034 | A | * | 12/1996 | Dao et al. ............. | 73/514.09 |
| 5,668,319 | A | * | 9/1997 | Garabedian ........... | 73/514.09 |
| 5,719,333 | A | * | 2/1998 | Hosoi et al. ........... | 73/514.05 |
| 5,945,601 | A | * | 8/1999 | Hosoi et al. ........... | 73/514.05 |
| 6,182,509 | B1 | * | 2/2001 | Leung .................. | 73/514.33 |
| 6,244,113 | B1 | * | 6/2001 | Naumann ............. | 73/521 |
| 6,666,088 | B1 | * | 12/2003 | Leung .................. | 73/488 |

FOREIGN PATENT DOCUMENTS

JP 63075568 A * 4/1988 ............. 73/514.11

* cited by examiner

*Primary Examiner*—Hezron Williams
*Assistant Examiner*—John C Hanley
(74) *Attorney, Agent, or Firm*—Sughrue Mion, PLLC

(57) ABSTRACT

A micro-accelerometer includes first and second closed cavities, into each of which an equal quantity of gas is introduced. A membrane partitions the symmetrical first and second cavities. Temperature sensors are provided within the first and second cavities, respectively, to measure the gas temperatures within the cavities. Difference of temperature is not caused so long as no acceleration affects the inner side of the cavities. However, if a linear acceleration is applied, the membrane is deformed in the direction of acceleration, whereby for example, the gas within the first temperature is compressed and its temperature increases, whereas the temperature of the second cavity decreases because the gas is expanded within the second cavity. The difference of gas temperatures between the first and second cavities is measured as a variation of electric power resistance by the temperature sensors and applied as a function of acceleration.

19 Claims, 4 Drawing Sheets

MICRO-ACCELEROMETER

CROSS-REFERENCE TO RELATED APPLICATIONS

This application claims priority from Korean Patent Application No. 2004-52953, filed on Jul. 8, 2004 in the Korean Intellectual Property Office, the disclosure of which is incorporated herein by reference in its entirety.

BACKGROUND OF THE INVENTION

1. Field of the Invention

The present invention relates to a micro-accelerometer for sensing and measuring accelerations or the other forces.

2. Description of the Related Art

Micro-accelerometers are utilized in the fields of various engineering applications such as the automotive industry, navigation systems, military industry, robot systems, electronic appliances and toys, due to their small size, low price, and high performance.

Micro-accelerometers typically include a sensor for sensing a proof mass and movements thereof. Micro-accelerometers can be classified as an electric capacity sensing type, a piezoresistance sensing type, a piezoelectricity sensing type and an optical sensing type according to the constructions and sensing methods thereof.

The electric capacity sensing type micro-accelerometers have an advantage in that they require less power and space and have a high sensitivity. However, they also have a disadvantage in that they are affected by electromagnetic interference and parasitic electromagnetic forces. Representative examples of such micro-accelerometers are described in U.S. Pat. Nos. 6,705,166, 6,311,556 and 6,305,714.

The piezoresistance sensing type micro-accelerometers have an advantage in that the production thereof is simple and that they have a compact readout circuit. However, they also have a disadvantage in that they have an inferior sensitivity and are affected by the ambient temperature. Representative examples of such micro-accelerometers are described in U.S. Pat. Nos. 6,683,558, 5,539,236 and 5,425,841.

The piezoelectricity sensing type micro-accelerometers have an advantage in that the production thereof is simple and that they have a simple readout circuit. However, they also have a disadvantage in that they suffer from the leakage of electronic charge and are affected by the ambient temperature. Representative examples of such micro-accelerometers are described in U.S. Pat. Nos. 6,655,211, 6,038,924 and 5,869,762.

Finally, the optical sensing type micro-accelerometers have a high sensitivity and their operation is effectively performed. However, they have a disadvantage in that their prices are very high. Representative examples of such micro-accelerometers are described in U.S. Pat. Nos. 6,628,400, 6,581,465 and 6,473,187.

SUMMARY OF THE INVENTION

Illustrative, non-limiting embodiments of the present invention overcome the above disadvantages and other disadvantages not described above. Also, the present invention is not required to overcome the disadvantages described above, and an illustrative, non-limiting embodiment of the present invention may not overcome any of the problems described above Accordingly, it is an aspect of the present invention to provide a micro-accelerometer based on a compressor sensing principle.

Another aspect of the present invention is to provide a micro-accelerometer which may be characterized by compact construction, low price, simple design of a readout circuit, prevention of electromagnetic interference and effect by the ambient temperature, and superior sensitivity.

According to an exemplary embodiment of the present invention, there is provided a micro-accelerometer comprising a membrane for partitioning a closed space into symmetrical first and second cavities, the membrane being deformed when an external force is applied; working fluid introduced into the first and second cavities in an equal quantity for each of the cavities, wherein the working fluid is compressed or expanded as the membrane is deformed; first and second temperature sensors provided within the first and second cavities, respectively, to measure the temperature of the working fluid compressed or expanded within the first and second cavities; and a readout circuit connected to the first and second temperature sensors to sense an acceleration.

The micro-accelerometer does not generate a temperature difference so long as no acceleration affects the inner sides of the cavities. However, if a linear acceleration is applied, the membrane is deformed in the direction of acceleration; for example, the working fluid within the first cavity is compressed and its temperature increases while the working fluid within the second cavity is expanded and its temperature decreases. The difference of temperatures of the working fluid between the first and second cavities is measured as a variation of electric resistance by the temperature sensors and applied as a function of acceleration.

According to an exemplary embodiment, the micro-accelerometer comprises a case member defining the closed space, wherein the case member is formed from an insulating material.

The membrane may be formed from an insulating member.

The working fluid may be any one selected from the group consisting of nitrogen, helium, argon, xenon, neon, and krypton gases that has a selected adiabatic constant when compressed.

The first and second temperature sensors may comprise platinum resistance temperature sensors, wherein the first and second temperature sensors are formed in S-shape.

The micro-accelerometer may comprise a power supply for supplying electric current to the first and second temperature sensors, by which its sensitivity can be enhanced.

The readout circuit may comprise a bridge circuit, a differential amplifier, a frequency compensation circuit, and a low-pass circuit. Here, the bridge circuit may comprise the first and second temperature sensors and two resistors.

According to another exemplary embodiment of the present invention, there is provided a micro-accelerometer comprising: a case member comprising first and second substrates each including a groove etched in a predetermined shape with a given depth, and a third substrate interposed between the first and second substrates and including grooves each symmetric to one of the grooves formed in the first and second substrates, wherein the third substrate is bonded to the first and second substrates, thus defining a closed space; a membrane bonded to the third substrate at its opposite ends, thus partitioning the closed space into two cavities, wherein the membrane is deformed when an external force is applied; gas introduced into the first and second cavities in an equal quantity for each of the cavities, wherein the gas is compressed or expanded as the membrane is deformed; first and second temperature sensors for measuring the gas temperature when compressed or expanded within the first and second cavities; a power supply for supplying a predetermined level of electric current to the first and second temperature sensors; and a readout circuit connected to the first and second temperature sensors to sense an acceleration.

Here, the first and second temperature sensors are positioned at the centers of the first and second cavities, and each of the first and second substrates is formed with two pads, wherein the two pads are positioned at opposite sides of the corresponding substrate for connection with the power supply and the readout circuit, respectively.

BRIEF DESCRIPTION OF THE DRAWINGS

The aspects of the present invention will become more apparent by describing in detail illustrative, non-limiting embodiments thereof with reference to the accompanying drawings, in which.

Figure 1:
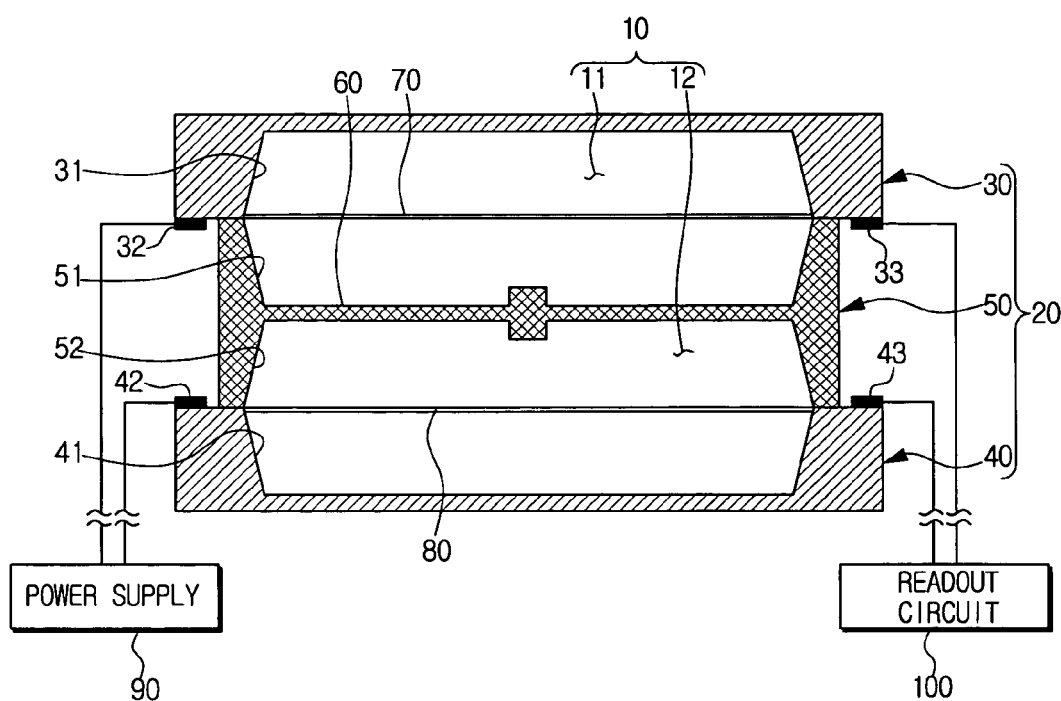
FIG. 1 schematically illustrates a micro-accelerometer according to an exemplary embodiment of the present invention.
Figure 2:
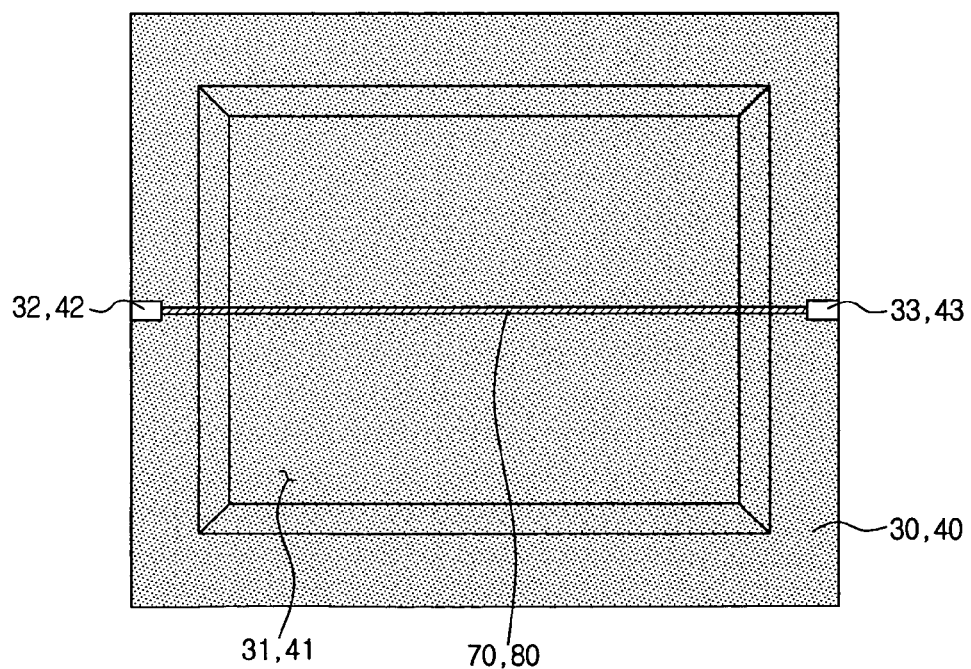
FIG. 2 is a top plan view of the first and second substrates extracted from the micro-accelerometer of FIG. 1.
Figure 3:
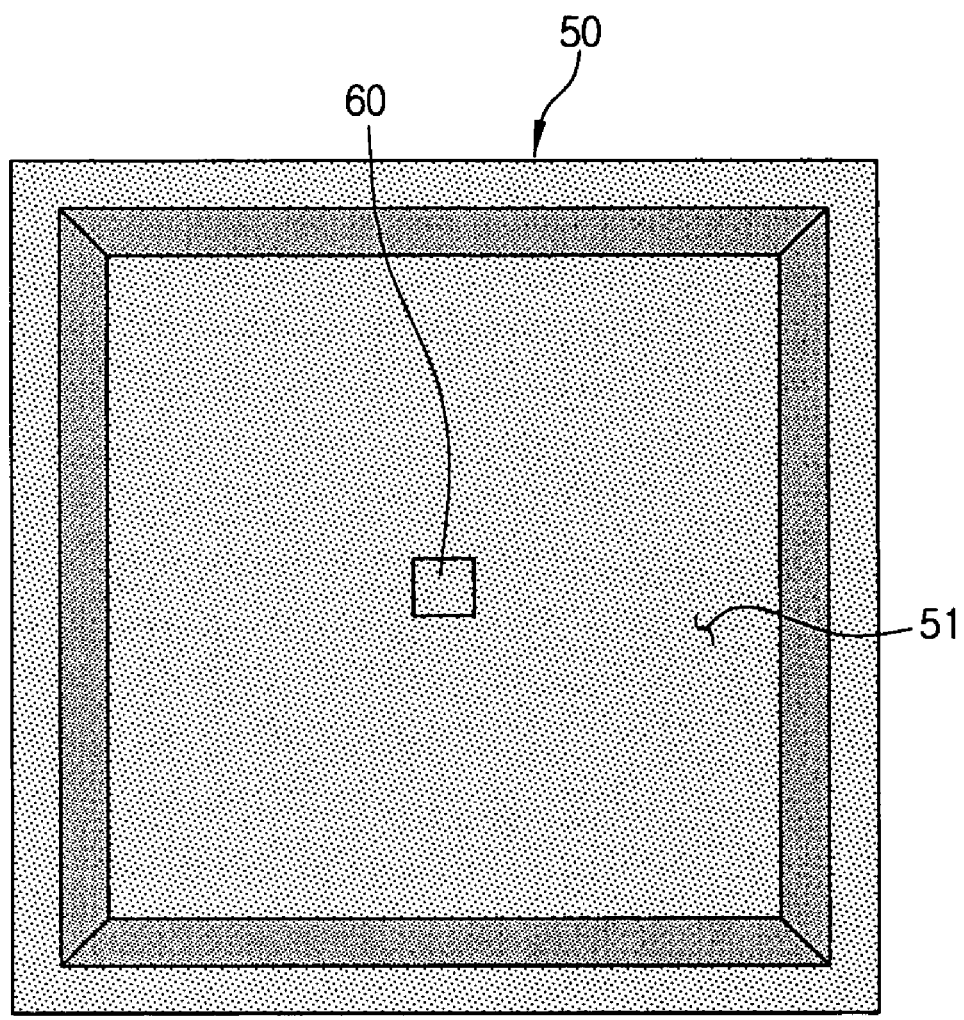
FIG. 3 is a top plan view of the third substrate extracted from the micro-accelerometer of FIG. 1.

DETAILED DESCRIPTION OF THE ILLUSTRATIVE, NON-LIMITING EMBODIMENTS OF THE INVENTION

Hereinbelow, exemplary embodiments of the present invention will be described in detail with reference to the accompanying drawings.

FIGS. 1 through 4 illustrate a micro-accelerometer according to an exemplary embodiment of the present invention.

As shown in FIGS. 1 through 4, the micro-accelerometer includes a case member 20 defining a closed space 10. The case member 20 includes first to third insulating substrates 30, 40 and 50.

The first and second substrates 30 and 40 are symmetrically formed and the third substrate 50 is interposed between the first and second substrates 30 and 40, wherein the third substrate is bonded to the first and second substrate 30 and 40.

The first and second substrates 30 and 40 have grooves 31 and 41, respectively, each of which is formed by etching the corresponding substrate in a predetermined shape with a predetermined depth. In addition, the third substrate 50 has second grooves 51 and 52 each formed symmetrically to one of the grooves 31 and 41. The case member 20 is fabricated by bonding the first to third substrates 30, 40 and 50 having such grooves 31, 41, 51, and 52.

The closed space 10 of the case member 20 is symmetrically partitioned into first and second cavities 11 and 12 by a membrane 60. The membrane 60 is a very thin film which is deformed in the direction of force when an external force is applied thereto. Such a membrane 60 is micro fabricated in or bonded to the third substrate 50 that it is positioned at the center of the second grooves 51 and 52, wherein the membrane 60 is formed from an insulating material.

In addition, the symmetric first and second closed cavities 11 and 12 are charged with working fluid, that is, gas, of a same kind in an equal quantity. The gas will be compressed or expanded as the first and second cavities 11 and 12 are volumetrically contracted or dilated when the membrane 60 is deformed. Such gas can be selected from those having a selected adiabatic constant when compressed, such as nitrogen, helium, argon, xenon, neon, and krypton.

First and second temperature sensors 70 and 80 are arranged on the first and second substrates 30 and 40, respectively, so as to sense the gas temperatures of the first and second cavities 11 and 12. The temperature sensors 70 and 80 are arranged to retain their height same with those of the first and second substrates 30 and 40, respectively, by which the temperature sensors 70 and 80 are respectively positioned at the exact centers of the corresponding cavities 11 and 12 in both the vertical and horizontal senses.

In the present exemplary embodiment, platinum resistance temperature sensors may be employed as the first and second temperature sensors 70 and 80. However, the present invention is not limited to these and any type of temperature sensors may be employed if they could sense the temperature charged in the closed space within the space. Herein, the first and second temperature sensors 70 and 80 have an "S" shape so as to obtain a constant resistance.

Meanwhile, the first and second substrates 30 and 40 are formed with first and second pads 32, 42, and 33, 43 at the opposite sides of the first and second temperature sensors 70 and 80, respectively, wherein the first and second pads 32, 42 and 33, 43 are connected with a power supply 90 and a readout circuit 100 to be explained below.

The power supply 90 is connected to the first and second temperature sensors 70 and 80 through the first pads 32 and 42 to supply a predetermined low and constant level of electric current to the temperature sensors 70 and 80.

The readout circuit 100 is connected to the first and second temperature sensors 70 and 80 through the second pads 33 and 43 to read signals from the first and second temperature sensors 70 and 80.

Figure 4:
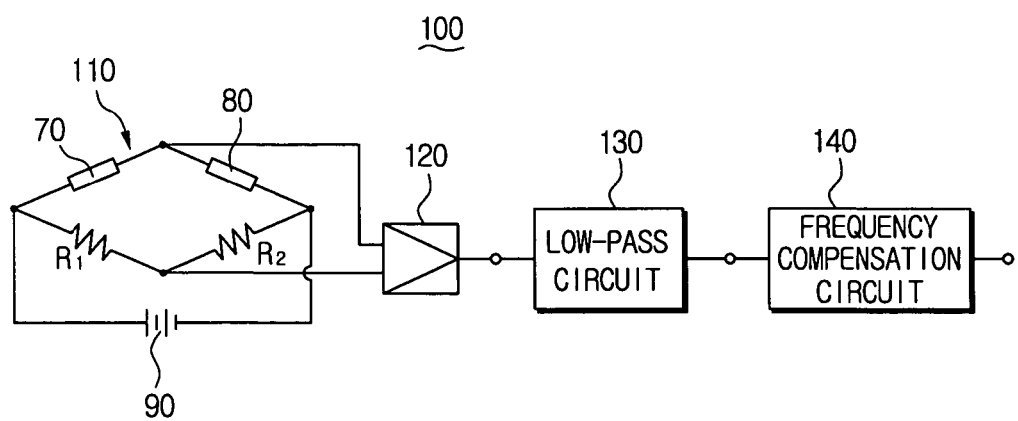
FIG. 4 is a schematic view of the readout circuit of the micro-accelerometer of FIG. 1.

As shown in FIG. 4, the readout circuit 100 includes a bridge circuit 110 having the first and second temperature sensors 70, 80 and two resistors R1, R2, a differential amplifier 120 connected with the bridge circuit 110, a low-pass circuit 130 with an input terminal being connected with an output terminal of the differential amplifier 120, and a frequency compensation circuit 140 with an input terminal being connected with an output terminal of the low-pass circuit 130.

Figure 5A:
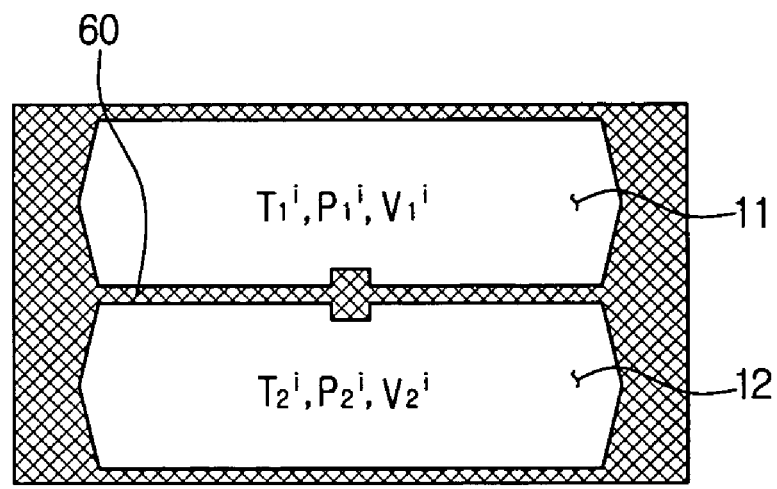
FIGS. 5A and 5B are views for describing the principle of measuring accelerations by means of the micro-accelerometer according to an exemplary embodiment of the present invention.
Figure 5B:
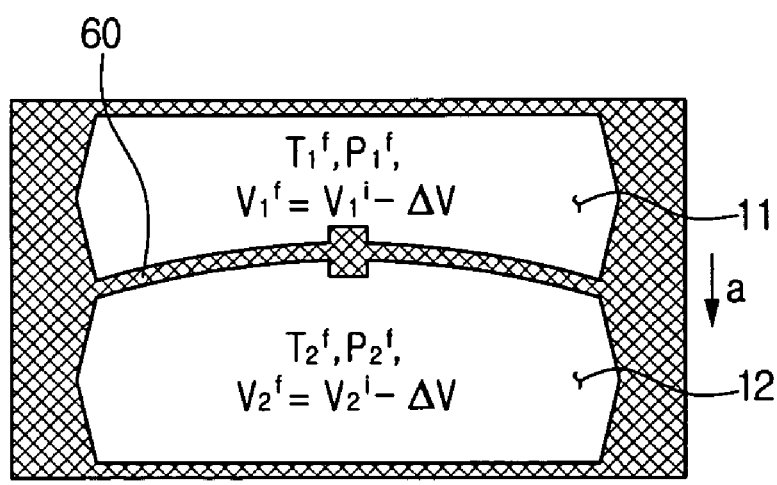

In the micro-accelerometer configured as described above, the difference of temperatures between the two cavities 11 and 12 is zero if no acceleration is provided, as shown in FIGS. 5A and 5B. If an acceleration "a" is provided and the membrane 60 is deformed, the volumes of the two cavities 11 and 12 are changed. According to the law of thermodynamics, the gas temperatures within the two cavities 11 and 12 are differently indicated as the volumes of the cavities 11 and 12 are changed. The deformation of the membrane 60 varies depending on the acceleration a. Thus, it is possible to measure the acceleration "a" on the basis of the measured difference in gas temperatures between the two cavities 11 and 12.

Through mathematical analysis, the micro-accelerometer mechanism according to an exemplary embodiment of the present invention is described in more detail.

FIG. 5A illustrates the status of the gas within the cavities 11 and 12 when no acceleration is provided to the micro-accelerometer. Due to the symmetric construction of the cavities 11 and 12, the status of the gas within the cavities is almost same. It is assumed that the initial temperatures, pressures, volumes and weights within the cavities 11 and 12 are $T_1^i$, $P_1^i$, $V_1^i$, $m_1$ and $T_2^i$, $P_2^i$, $V_2^i$, $m_2$, respectively.

FIG. 5B illustrates the status of the gas when a downward acceleration "a" is suddenly provided to the micro-accelerometer. In such a situation, the membrane 60 is deformed to be upwardly convex. Due to such deformation of the membrane 60, the volume of the first cavity is reduced and the gas therein is compressed. The thermodynamic properties are also changed to $T_1^f$, $P_1^f$ and $V_1^f$. At the same time, the gas within the second cavity 12 is also changed to new thermodynamic properties, $T_2^f$, $P_2^f$ and $V_2^f$. Because the first and second cavities 11 and 12 take a same compressor configuration, a typical equation for a compressor can be used for determining the current status of the micro-accelerometer. Because the first and second cavities 11 and 12 were same with each other in initial size, and kind and weight of internal gas, the above-mentioned procedure can be expressed as follows.

$$T_1^i = T_2^i \; P_1^i = P_2^i \; V_1^i = V_2^i \; m_1 = m_2 \tag{1}$$

$$T_1^f = T_1^i \left(\frac{P_1^f}{P_1^i}\right)^{(n-1)/n} \quad T_2^f = T_2^i \left(\frac{P_2^f}{P_2^i}\right)^{(n-1)/n} \tag{2}$$

$$P_1^f V_1^f = m_1 R T_1^f \quad P_2^f V_2^f = m_2 R T_2^f \tag{3}$$

$$P_1^i V_1^i = m_1 R T_1^i \quad P_2^i V_2^i = m_2 R T_2^i \tag{4}$$

$$\Delta V = V_2^f - V_2^i = V_1^i - V_1^f \tag{5}$$

$\Delta V$ indicates difference in volume, R is the gas constant based on weight and physical properties of gas, and n is polytropic exponent having a value in the range of 1 to 2 (that is, $1 < n \leq 2$). In the case of adiabatic compression, which is a typical process of polytropic procedure, n is identical to the adiabatic constant k.

According to Equations 1 through 5, the difference of temperatures between the first and second cavities 11 and 12, $\Delta T$, can be expressed by an approximation equation as follows.

$$\Delta T = T_1^f - T_2^f \approx T_1^i \left[\left(1 - \frac{\Delta V}{V_1^i}\right)^{(1-n)/n} - \left(1 + \frac{\Delta V}{V_1^i}\right)^{(1-n)/n}\right] \tag{6}$$

The practical value of $\Delta T$ shall be higher than that of the right term. That is, the sensitivity of the inventive accelerometer is estimated in a lower value by Equation 6.

By using the Taylor series expansion, Equation 6 is modified as follows.

$$\Delta T = T_1^f - T_2^f \approx 2 T_1^i \left(\frac{n-1}{n}\right) \frac{\Delta V}{V_1^i} \tag{7}$$

By Equation 7, the final approximation of $\Delta T$ can be obtained when an acceleration is input.

Because $\Delta V$ is determined depending on the movement of the membrane caused by the acceleration provided to the micro-accelerometer, the following relationship is met.

$$\Delta V \propto f(a) \tag{8}$$

If Equations 7 and 8 are combined, the following equation is obtained.

$$\Delta T = T_1^f - T_2^f \propto 2 T_1^i \left(\frac{n-1}{n}\right) \frac{1}{V_1^i} f(a) \tag{9}$$

It will be appreciated that the external acceleration can be measured by measuring the difference in gas temperatures between the two cavities according to Equations 7 to 9.

In order to increase the sensitivity of the inventive micro-accelerometer, the value of $\Delta T$ shall be increased. According to Equation 9, the following method can be used so as to increase the sensitivity.

i) To increase the initial temperature, $T_1^i$, of the gas in the cavities. By using the power supply 90, a low and constant level of electric current is applied to the temperature sensors 70 and 80, so that the sensors serve as a small-sized heater for increasing the temperature, $T_i$. A temperature sensor with a low and constant level of electric current may have a good linearity.

ii) To increase the polytropic exponent, n. As described above, n is determined by the type of gas and compression procedure. In the case of adiabatic compression and a single atom gas, the value of n may be high. For the adiabatic compression, the packaging shall also be good enough.

iii) To increase $\Delta T/V_1^i$. Following two methods can be employed. The one is to reduce the capacity of the cavity $V_1^i$. According to the Microelectromechanical Systems (MEMS) production method, it is possible to obtain a small-sized cavity. The other is to increase $\Delta V$, wherein $\Delta V$ is determined depending on the deformation of the membrane 60, and the deformation of the membrane 60 varies depending on its material and the design of size and weight thereof.

As described above, according to an exemplary embodiment of the present invention, it is possible to provide a micro-accelerometer with a simple construction, wherein the micro-accelerometer is inexpensive because it can be easily fabricated and mass-produced using the MEMS technology.

It is also possible to provide a micro-accelerometer which allows a readout circuit to be simply and easily designed because a widely used bridge circuit may be employed.

In addition, it is possible to provide a micro-accelerometer which is not affected by electromagnetic interference and effect of the ambient temperature because temperature sensors are not affected by electromagnetic interference and the signal sensing is based on the difference of temperatures obtained from two sensors.

Moreover, because the MEMS fabrication and packaging process is employed, it is possible to provide a micro-accelerometer with a superior sensitivity.

While the exemplary embodiments of the present invention have been shown and described with reference to the drawings in order to exemplify the principle of the present invention, the present invention is not limited to the exemplary embodiments. It will be understood that various modifications and changes can be made by those skilled in the art without departing from the spirit and scope of the invention as defined by the appended claims. Therefore, it shall be considered that such modifications, changes and equivalents thereof are all included within the scope of the present invention.

What is claimed is:

1. A micro-accelerometer comprising:
   a membrane which partitions a closed space into symmetrical first and second cavities, the membrane being deformed when an external force is applied;
   first and second working fluids which are provided within the first and second cavities, respectively, in equal quantities, the first and second working fluids being compressed or expanded as the membrane is deformed;
   first and second temperature sensors which are disposed within the first and second cavities, respectively, and measure temperatures of the first and second working fluids, respectively; and
   a readout circuit connected to the first and second temperature sensors to sense an acceleration based on the temperatures of the first and second working fluids.

2. The micro-accelerometer as claimed in claim 1, further comprising a case member which defines the closed space and is formed from an insulating material.

3. The micro-accelerometer as claimed in claim 1, wherein the membrane is formed from an insulating member.

4. The micro-accelerometer as claimed in claim 1, wherein the first and second working fluids have a selected adiabatic constant when compressed.

5. The micro-accelerometer as claimed in claim 4, wherein the first and second working fluids are selected from the group consisting of nitrogen, helium, argon, xenon, neon, and krypton gases.

6. The micro-accelerometer as claimed in claim 1, wherein each of the first and second temperature sensors comprises a platinum resistance temperature sensor.

7. A micro-accelerometer as claimed in claim 6, wherein each of the first and second temperature sensors is formed in an S-shape.

8. The micro-accelerometer as claimed in claim 1, further comprising a power supply which supplies an electric current to the first and second temperature sensors.

9. The micro-accelerometer as claimed in claim 1, wherein the readout circuit comprises a bridge circuit, a differential amplifier, a frequency compensation circuit, and a low-pass circuit.

10. The micro-accelerometer as claimed in claim 9, wherein the bridge circuit comprises the first and second temperature sensors and first and second resistors.

11. A micro-accelerometer comprising:
    a case member comprising first and second substrates each including a groove, and a third substrate interposed between the first and second substrates including grooves which are symmetric to the grooves formed in the first and second substrates, the third substrate being bonded to the first and second substrates to define a closed space;
    a membrane fabricated in or bonded to the third substrate, the membrane partitioning the closed space into two cavities, and the membrane being deformed when an external force is applied;
    first and second gases provided within the first and second cavities, respectively, in equal quantities, and the first and second gases being compressed or expanded as the membrane is deformed;
    first and second temperature sensors which measure the temperatures of the first and second gases, respectively;
    a power supply which supplies a predetermined level of electric current to the first and second temperature sensors; and
    a readout circuit connected to the first and second temperature sensors to sense an acceleration based on the temperatures of the first and second gases.

12. The micro-accelerometer as claimed in claim 11, wherein the first and second temperature sensors are positioned at centers of the first and second cavities, respectively, and each of the first and second substrates is formed with two pads which are positioned at opposite sides of the corresponding substrate for connection with the power supply and the readout circuit, respectively.

13. The micro-accelerometer as claimed in claim 12, wherein the case member and the membrane are formed from an insulating material.

14. The micro-accelerometer as claimed in claim 12, wherein the first and second gases have a selected adiabatic constant when compressed.

15. The micro-accelerometer as claimed in claim 14, wherein the first and second gases are selected from the group consisting of nitrogen, helium, argon, xenon, neon, and krypton gases.

16. The micro-accelerometer as claimed in claim 12, wherein each of the first and second temperature sensors comprises a platinum resistance temperature sensor.

17. The micro-accelerometer as claimed in claim 16, wherein each of the first and second temperature sensors is formed in an S-shape.

18. The micro-accelerometer as claimed in claim 12, wherein the readout circuit comprises a bridge circuit, a differential amplifier, a frequency compensation circuit, and a low-pass circuit.

19. The micro-accelerometer as claimed in claim 18, wherein the bridge circuit comprises the first and second temperature sensors and first and second resistors.

* * * * *